J. QUINN.
HOISTING APPARATUS.
APPLICATION FILED JULY 22, 1916.

1,200,649.

Patented Oct. 10, 1916.

Inventor
JOSEPH QUINN

By Watson E. Coleman
Attorney

UNITED STATES PATENT OFFICE.

JOSEPH QUINN, OF PHILADELPHIA, PENNSYLVANIA.

HOISTING APPARATUS.

1,200,649.  Specification of Letters Patent.  Patented Oct. 10, 1916.

Application filed July 22, 1916. Serial No. 110,727.

*To all whom it may concern:*

Be it known that I, JOSEPH QUINN, a citizen of the United States, residing at Philadelphia, in the county of Philadelphia and State of Pennsylvania, have invented certain new and useful Improvements in Hoisting Apparatus, of which the following is a specification, reference being had to the accompanying drawings.

This invention comprehends certain new and useful improvements in hoisting devices, and relates particularly to a device of this character designed for use in raising the bodies of automobiles or other vehicles, although it is to be understood that the invention is not limited to this use but that the device may also be used with equal facility in raising any desired load or weight.

The invention has for its primary object a durable and efficient construction of device of this character, which will be found very convenient and useful for automobile machinists in raising the body of a vehicle for any purpose such as repair, replacement or detachment of any of the parts, the device being so constructed and arranged that it may be very easily moved from place to place, quickly adjusted to different sizes as required, and easily operated to lift the required load. And the invention also aims to generally improve devices of this class so as to render them more useful and commercially desirable.

With these and other objects in view, the invention consists in certain constructions, arrangements and combinations of the parts that I shall hereinafter more fully describe and claim.

For a full understanding of the invention, reference is to be had to the following description and accompanying drawing, in which—

Figure 1:
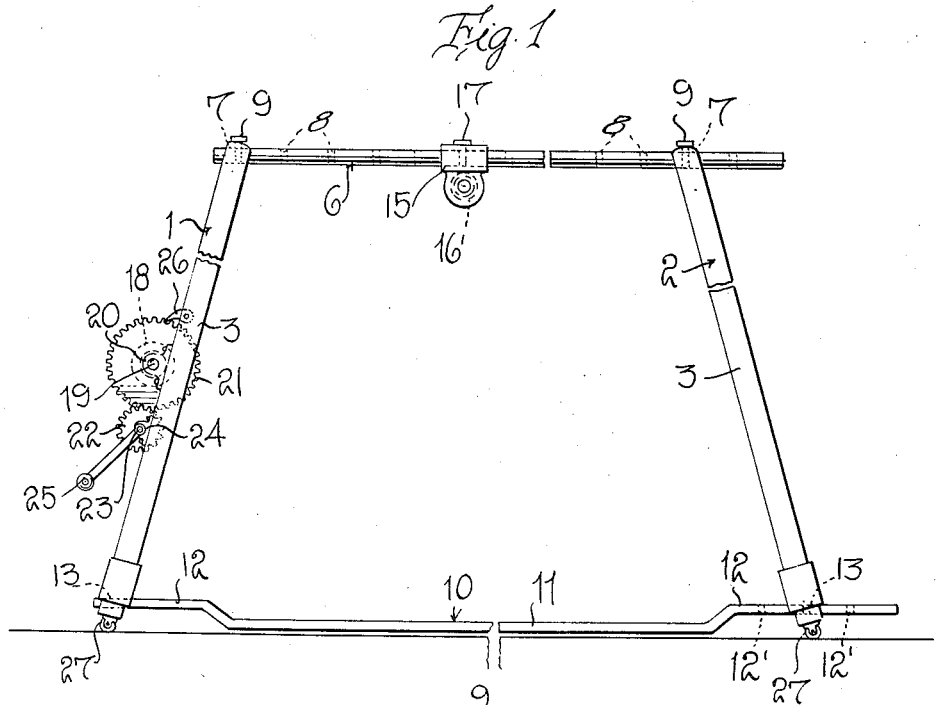
Figure 2:
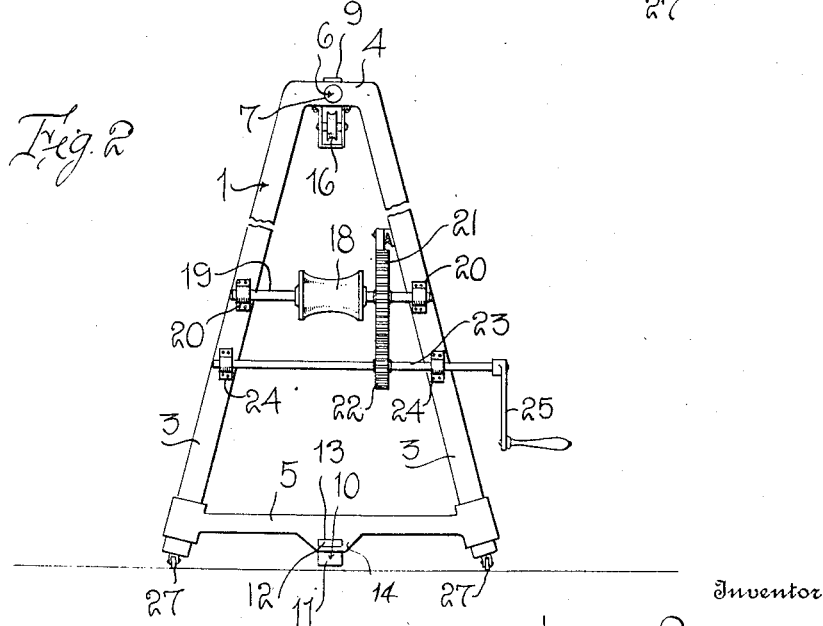

Figure 1 is a side elevation of a hoisting apparatus constructed in accordance with my invention, and Fig. 2 is an end elevation thereof.

Corresponding and like parts are referred to in the following description and designated in all of the views of the accompanying drawing by like reference characters.

The framework of my improved hoisting apparatus comprises a pair of uprights 1 and 2, each of said uprights, in the present embodiment of the invention, consisting of upwardly converging standards 3 connected at their upper ends by means of a preferably integral cross bar 4 and near their lower ends with a cross brace 5, the parts being preferably tubular so as to possess the characteristic of lightness without sacrificing strength.

The uprights 1 and 2 are connected at their upper ends by means of a longitudinally extending bar 6 which extends at its ends through openings 7 formed in the cross bars 4, said bar 6 being formed with any desired number of apertures 8 extending therethrough, preferably in a series of regularly spaced openings that extend from one end of the bar 6 to the other, and pins 9 are adapted to be extended down into the apertures 8 and into openings formed for them in the cross bars 4 whereby the uprights 1 and 2 may be secured in spaced relation to each other at their upper ends at different distances apart, as required. The uprights are connected near their lower ends by means of a longitudinally extending brace bar 10 which is formed with an intermediate dipped or downwardly offset portion 11 and upwardly offset end portions 12 which extend through openings 13 formed in depending portions 14 with which the lower cross bars or braces 5 are provided at the middle of the latter. Either one or both of the ends 12 of the longitudinally extending brace bar 10 may be formed with apertures 12' to receive pins whereby the lower ends of the uprights may be held in the required spaced relation to each other and prevented from accidentally spreading, and the intermediate portion 11 of the bar 10 is preferably depressed, as shown, so as to be out of the way and not interfere with the work. A sleeve or casing 15 is mounted to slide longitudinally upon the upper longitudinal bar 6, said casing carrying a pulley 16 and being held in desired adjusted positions along the bar 6 by means of a pin 17 extending through the top of the casing and into any one of the apertures 8 hereinbefore referred to. A hoisting cable is designed to extend over the pulley 16, and around a hoisting drum 18, which is mounted upon a transverse shaft 19, journaled in bearings 20 carried by the standards 3 of the upright 1 and on the shaft 19 is a relatively large gear wheel 21 which meshes with a spur pinion 22 on a corresponding transverse shaft 23 journaled in bearings 24 similar to and underneath the bearings 20. The shaft 23 is provided at one end with a crank handle 25, whereby it may be easily turned, and a pawl 26 is designed to engage with the wheel 21 to hold the load at the desired elevated position. Preferably the uprights 1 and 2 are provided with rollers 27 whereby the entire apparatus may be easily moved from place to place, as required.

From the foregoing description in connection with the accompanying drawing, the operation of my improved hoisting apparatus will be apparent. In the practical use of the device, the uprights 1 and 2 are adjusted according to the size or character of the work and the pulley casing 15 is correspondingly adjusted along the bar 6, the automobile body or similar weight being then easily lifted by means of the cable extending over the pulley 16 and around the hoisting drum 18.

While the accompanying drawing illustrates what I believe to be the preferred embodiment of my invention, it is to be understood that the invention is not limited thereto but that various changes may be made in the construction, arrangement and proportions of the parts without departing from the scope of the invention as claimed.

What is claimed, is:

1. A hoisting apparatus comprising uprights, each of which embodies standards, and cross bars connecting said standards together at their upper and lower ends, a longitudinally extending brace bar adjustably connected to the upper cross bars of the uprights, a lower longitudinally extending brace bar adjustably connected to the lower cross bars of the uprights, a pulley casing carried by the upper longitudinal bar, a pulley carried by said casing, a hoisting drum carried by one of said uprights, and means for turning said drum.

2. A hoisting apparatus, comprising uprights, each of which embodies standards, and cross bars connecting the standards together at their upper ends, said cross bars having openings formed therein, a longitudinally extending brace bar received in and movable through said openings and formed with a longitudinally extending series of openings extending therethrough, pins receivable in the openings of said bar and into the cross bars of the uprights, whereby the uprights may be held at different distances apart, a pulley casing carried by and movable longitudinally on said bar, a pin carried by said casing and adapted to extend into the openings of the longitudinally extending brace bar whereby the casing may be held at different points along the same, and a pulley carried by said casing.

3. A hoisting apparatus comprising uprights, each of which embodies standards, cross bars connecting said standards together at their upper ends and cross bars connecting said standards together near their lower ends, a longitudinally extending brace bar adjustably connected to the upper cross bars of the uprights, the lower cross bars being formed with openings, a lower longitudinally extending brace bar having a depressed middle portion and upwardly offset ends, the latter extending through the openings in the lower cross bars of the uprights, a pulley casing carried by the upper longitudinal bar, a pulley carried by said casing, a hoisting drum carried by one of said uprights, and means for turning said drum.

4. A hoisting apparatus of the character described, comprising uprights embodying standards, cross bars connecting said standards together at their upper ends, lower cross bars connecting said standards together near their lower ends, said last named cross bars being formed with intermediate downwardly extending portions having openings formed therein, a longitudinally extending brace bar having its ends received in the openings in the lower cross bars, for the purpose specified, a longitudinally extending upper bar having adjustable connection with the upper cross bars of said uprights, a pulley casing and pulley carried by said upper longitudinal bar and adjustable therealong, upper and lower transverse shafts carried by one of said uprights, a drum carried by one of said shafts, a gear wheel mounted on said shaft, a pinion meshing with said gear wheel and mounted on the other shaft, and a crank handle secured to the last named shaft, as and for the purpose set forth.

In testimony whereof I hereunto affix my signature in the presence of two witnesses.

JOSEPH QUINN.

Witnesses:
J. CREEDON,
HARRY N. CARTER.